Figure 1A:
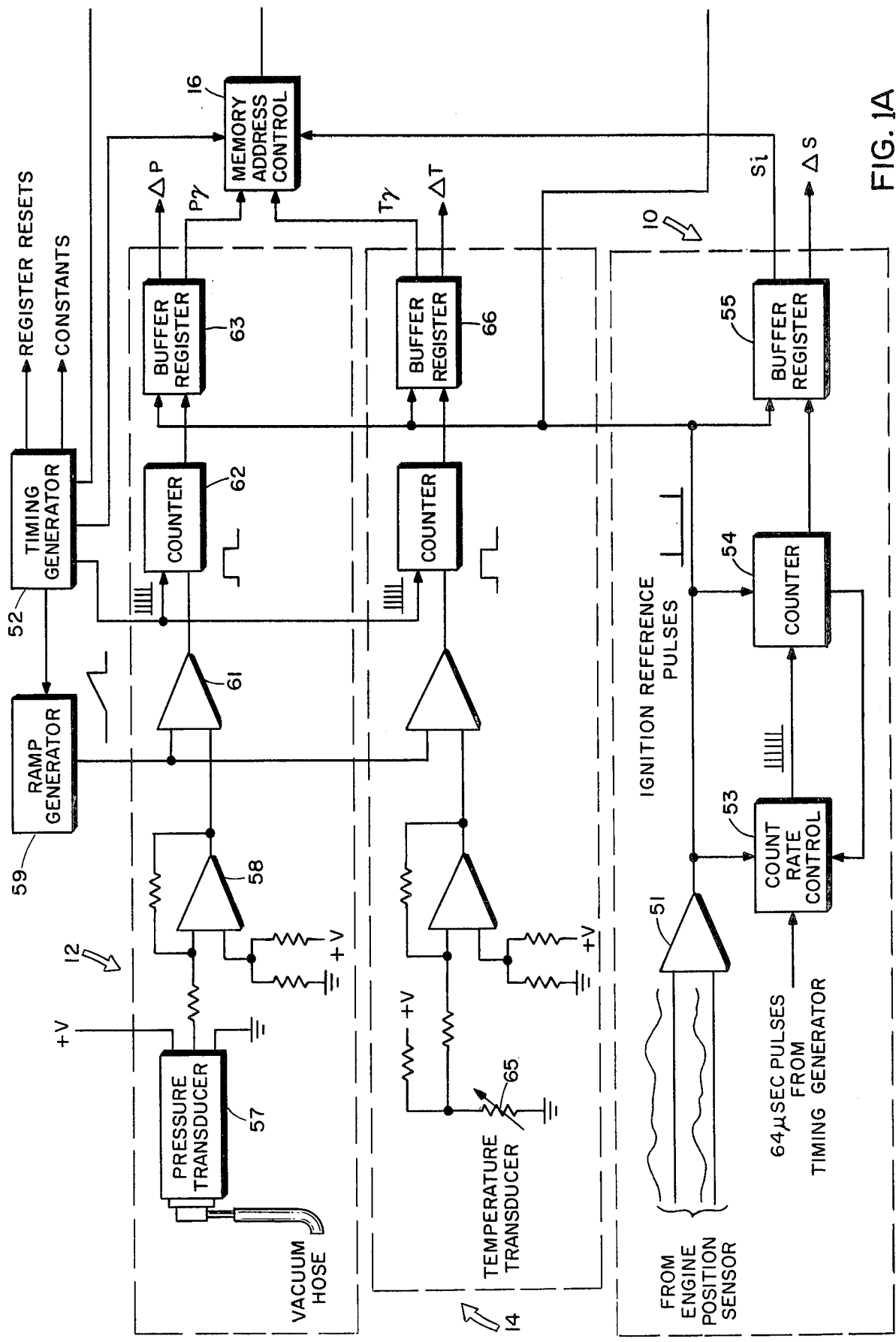

United States Patent [19]

Schira

[11] 4,258,684

[45] Mar. 31, 1981

[54] DIGITAL IGNITION TIMING CONTROLLER

[75] Inventor: John J. Schira, Westland, Mich.

[73] Assignee: The Bendix Corporation, Southfield, Mich.

[21] Appl. No.: 906,309

[22] Filed: May 16, 1978

[51] Int. Cl.³ .............................................. F02P 5/04
[52] U.S. Cl. .................................... 123/416; 123/418
[58] Field of Search ........... 123/117 R, 117 D, 148 E, 123/32 EB, 32 EC

[56] References Cited

U.S. PATENT DOCUMENTS

| 3,835,819 | 9/1974 | Anderson, Jr. | 123/117 D X |
| 3,904,856 | 9/1975 | Monpetit | 123/117 D |
| 3,964,443 | 6/1976 | Hartford | 123/32 EB |
| 4,044,236 | 8/1977 | Bianchi et al. | 123/32 EA X |
| 4,051,822 | 10/1977 | Yoshida | 123/117 D |
| 4,083,347 | 4/1978 | Grather et al. | 123/148 DS X |
| 4,119,069 | 10/1978 | Perrin | 123/117 D |
| 4,121,553 | 10/1978 | Hasegawa | 123/32 EC |
| 4,142,493 | 3/1979 | Schira et al. | 123/119 A |

Primary Examiner—Tony M. Argenbright
Attorney, Agent, or Firm—Markell Seitzman; Russel C. Wells

[57] ABSTRACT

A digital electronic spark timing control for an internal combustion engine. Independent parameters such as engine speed and manifold pressure are measured and encoded as multibit digital words. A digital memory stores spark advance angle as a function of two independent parameters. The digital memory is addressed by the most significant bits of the multibit words to obtain coarse values of spark timing. Interpolation is performed on the coarse values according to the least significant bits of the digital words to produce the spark advance angle appropriate for the measured parameters. Means synchronized with engine position, i.e., top center, convert the spark advance angle to spark initiation signal.

16 Claims, 3 Drawing Figures

DIGITAL IGNITION TIMING CONTROLLER

The present invention relates to a digital electronic spark timing control for a spark ignited internal combustion engine. More particularly, the invention relates to a digital spark timing control wherein the spark advance angle is determined by interpolation between stored values of advance angle referenced to particular values of engine operating parameters to provide more accurate timing for the engine operating parameters actually prevailing.

It has been recognized that the conventional centrifugal-vacuum advance mechanisms of breaker type ignition systems are incapable of producing the complex timing functions required for best performance and operating economy by an internal combustion engine. Accordingly, electronic timing controls have been devised with the intent of providing more readily implemented systems in which the timing angle was determined as a complex function of two or more engine operating parameters. The earliest electronic timing controls were of the analog type and although a marked improvement in the control function was thereby enabled, such controls still could not provide nonlinear control functions in commercially acceptable systems.

More recently the availability of digital electronic circuits has stimulated development of digital electronic timing controls. In the automotive field much effort has been devoted to realizing the maximum computational power from such circuits at minimum cost so that digital electronic systems might compete effectively with the systems they are to replace. A limiting factor has been the capacity of the digital memories used to store the transfer functions which represent the timing prescribed for particular operating parameters.

In U.S. Pat. No. 4,052,967, issued Oct. 11, 1977, to Colling et al for Digital Electronic Ignition Spark Timing Systems, there is disclosed a system in which the spark timing transfer functions are stored in two separate memories as single-valued functions of separate operating parameters. One quantity stored is spark advance v. engine speed. The other quantity stored is spark advance v. manifold pressure. By appropriate manipulation the two independent values of spark advance are added together and converted to a proportional part of a count representing engine speed. The proportioned count computed in a first firing cycle is subtracted from the speed count and on the next firing cycle spark is initiated whenever the running speed count equals the previously computed difference count. Conversion of a spark advance angle to a time signal in this manner is hereinafter referred to as "delay programming".

The Colling et al system provides the capability of timing the spark in accordance with non-linear transfer functions of engine speed and manifold pressure, an operation not readily, if at all, achievable by analog systems, such as are disclosed in U.S. Pat. No. 885,534, issued May 27, 1975, to Webster for Electronic Advance and Retard Circuit. However, Colling et al computes the spark timing from single valued transfer functions of single independent variables, whereas experiment has shown that the preferred transfer functions are multi-valued functions of two independent variables.

Graphically, a single valued function of a single independent variable can be represented as a curve drawn on a two dimensional plane wherein the value of the function, $y$, is plotted against the independent variable, $x$. A multi-valued function of two independent variables can be represented as a three dimensional surface enclosing the set of values of the function, $z$, plotted against the independent variables $x$ and $y$. Commonly available digital memories may be used for storing either sort of such functions. Typically, a 2048 bit memory stores and recalls upon command any desired 8 bit digital word at any of 256 locations addressable by an 8 bit digital word. In storing a single valued function, the entire 8 bits of the address word would be used for the single independent variable, thus enabling the range of values of the independent variable to be resolved into 256 parts. In storing a multi-valued function, the 8 bit address word would be composed of a composite of say 4 bits for the independent variable x and 4 bits for the independent variable y. Thus the range of each of the input variables can be resolved only into 16 parts and the surface enclosing the 256 data points is much rougher than a single valued function composed of 256 segments. Although the spark timing transfer functions are more accurately expressed as multi-valued functions of two independent variables, resolution of the functions is degraded, unless the memory capacity is drastically increased or unless measures are taken to restore the resolution.

In U.S. Pat. No. 4,142,493 filed Sept. 29, 1977, by J. J. Schira, J. R. Phipps and A. D. Toelle for "Closed Loop Exhaust Gas Recirculation Control System", assigned to the assignee of this application, there is disclosed a method involving double linear interpolation of multi-valued transfer function stored in limiting capacity memories which substantially restores the resolution sacrificed by employing the memory in such manner.

It is the object of the present invention to provide a digital electronic spark timing control in which the spark timing is computed from stored multi-valued functions of two independent variables.

It is another object of the invention to provide a digital electronic spark timing control employing memories of limited capacity for storing of multi-valued functions of two independent variables in which the accuracy of timing is not degraded because of a reduction in resolution of the stored functions.

It is a further object of the invention to provide a digital electronic spark timing control, utilizing angle programming, rather than delay programming, for improved accuracy of timing and for improved range of control.

It is still another object of the invention to provide a digital electronic spark timing control in which the spark timing is computed for stored multi-valued functions of two independent variables, neither of which independent variable, if desired, includes engine speed.

Another object of the invention is to provide a digital electronic spark timing control in which the rate of change of spark timing may be limited without adverse results under conditions of rapid fluctuations in the engine speed.

These and other objects will become evident as an understanding of the invention is gained through study of the following description and the accompanying drawings.

Briefly, the invention comprises a digital electronic spark timing control in which engine operating parameters such as engine speed, manifold pressure, temperature, etc. are converted to digital numbers. The most significant digits of a pair of such numbers are combined and used to address a memory to obtain a number corresponding to the spark angle prescribed for the conditions of the addressed point. The variables of the address are incremented, in combinations, so that, in all, four points on a stored data surface are retrieved. The least significant digits of the pair of address numbers are used with the retrieved data in a double linear interpolation process to develop a spark angle corresponding to a point on the stored data surface surrounded by the retrieved data points and closely approximating the prescribed spark angle for highly resolved address points. The spark angle is computed for each firing interval and is updated for timing purposes by taking the difference between the spark angle used for the most recent firing and the presently computed angle. A controlled fraction of this difference is added to the spark angle used for the most recent firing and the sum becomes the angle to be used for the next firing. Updating in this manner limits the rate at which spark timing can change. The updated spark angle is converted to a timing signal by utilizing the updated spark angle to control the rate at which clock pulses are counted in an up counter during one interval between ignition reference pulses. The count accumulated in the up counter is transferred to a presettable down counter which counts down at the fixed clock rate during the following interval between ignition reference pulses. Spark is triggered when the down counter reaches zero.

Figure 1B:
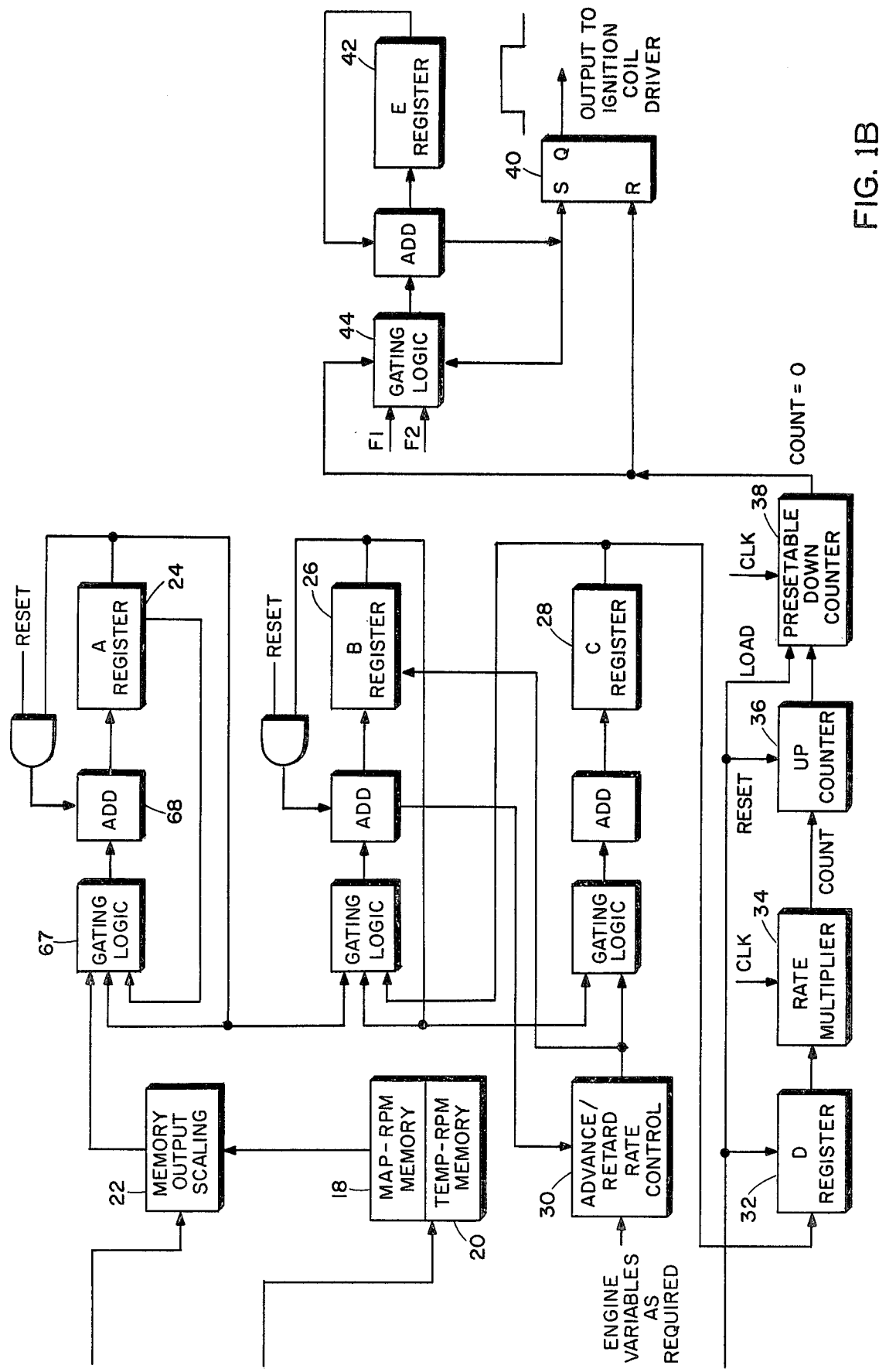
Figure 2:
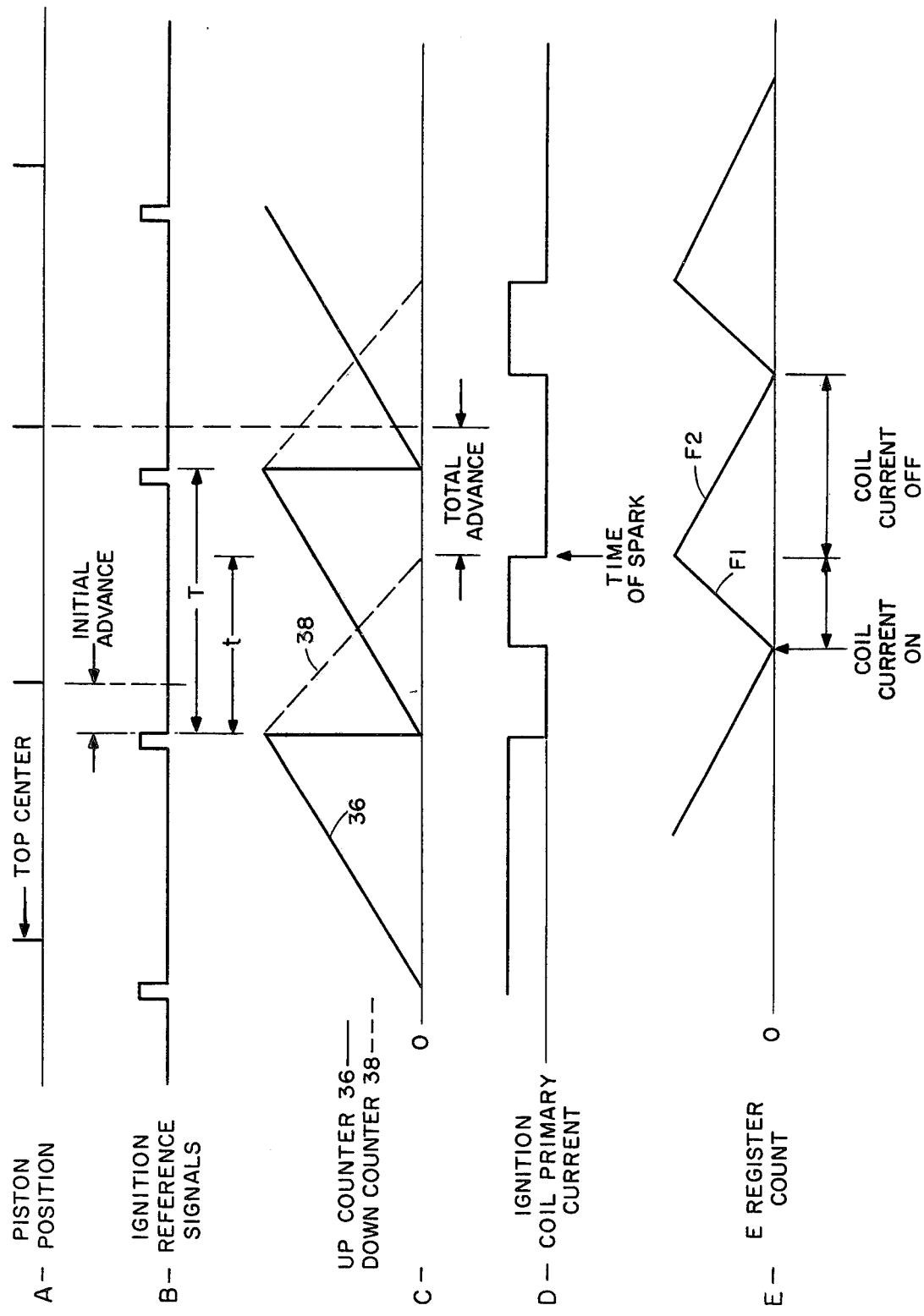

In the drawings:

FIGS. 1a and 1b show a functional block diagram of the digital electronic ignition timing control of the invention; and FIG. 2 is a timing diagram helpful in understanding the operation of the invention.

Referring to FIG. 1, the engine operating parameter of primary interest in a spark timing control is the engine speed. This variable is provided in the form of a digital word indicative of the engine period by the circuitry of block 10. The parameter next in order of interest in a spark timing system is the manifold absolute pressure. This variable, commonly referred to as manifold vacuum, is determined and converted to a digital word by the circuitry of block 12. A third parameter, at the choice of the designer, may be ambient air temperature or engine coolant temperature. This variable is determined and converted to a digital word by the circuitry of block 14.

The three digital words representing engine speed, manifold pressure, and temperature are used to address, through a memory address control 16, two separate ROM type digital memories 18,20 having stored therein, respectively, numbers related to the spark angle prescribed for various combinations of engine speed and manifold pressure and for various combinations of engine speed and temperature. Numbers are transferred in separate interpolation cycles through scaling circuitry 22, into "A" register 24 and thence to "B" register 26. Scaling circuitry 22 and registers 24 and 26 cooperatively perform the arithmetical operations of the interpolation process.

"A" and "B" registers 24, 26 and scaling circuitry 22 perform interpolation first on the data from memory 18 and then on the data from memory 20. At the conclusion of interpolation the difference between the contents of "B" register 26 and "C" register 28 is found and a programmed fraction of this difference, as determined by advance-retard rate control 30, is added to the contents of "C" register 28. The spark angle data contained by "C" register 28 is transferred to "D" register 32 at the beginning of a spark timing cycle. The contents of "D" register 32 establish, through rate multiplier 34, the rate at which clock pulses are counted by an up counter 36. The count accumulated by up counter 36 during an initial firing cycle is used to preset a down counter 38 at the beginning of the subsequent firing cycle. During that subsequent firing cycle down counter 38 is decremented at a fixed clock rate and upon reaching zero count, signal appears therefrom which causes reset of an ignition coil current control flip-flop 40. Reset of flip-flop 40 causes current flow in the ignition coil primary to be interrupted and the ignition spark to be generated.

An "E" register 42 controls the dwell, i.e. ratio of current on time to current off time, of the ignition coil primary. During an initial firing cycle, the content of "E" register 42 is zero causing flip-flop 40 to be set thereby establishing current flow in the ignition coil primary. at tbhis time "E" register 42 commences accumulating count at a rate of $F_1$. When down counter 38 causes reset of flip-flop 40, triggering the spark, gating logic 44 switches "E" register 42 from incrementing count at the rate $F_1$ to decrementing the accumulated count at a rate $F_2$. During the interval "E" register 42 is counting down from the accumulated count at the rate $F_2$, flip-flop 40 remains in the reset condition and no current flows in the ignition coil primary. When "E" register 42 reaches zero count, flip-flop 40 is set, reestablishing current flow in the coil primary and, through gating logic 44, switching "E" register 42 to again incrementing count at the rate of $F_1$. At all but the lowest engine speeds, when the time available for accumulating count at the rate $F_1$ may result in a count exceeding the capacity of "E" register 42, the dwell is equal to the ratio of $F_1$ to $F_2$ and is independent of engine speed. If the engine speed is so slow as to cause the "E" register to reach its full capacity, the duration of current interruption will be fixed at a time determined by the register count capacity and the decrement rate $F_2$.

The invention has been described summarily to aid in understanding the more detailed description next to follow. Many of the elements of the invention are substantially identical in structure and operation to elements of the above referenced U.S. Pat. No. 4,142,493 by Schira et al. In the description to follow cross-references will be made to specified portions of said U.S. Pat. No. 4,142,493 as providing supplemental details.

Continuing with reference to FIG. 1, the engine speed or, expressed more precisely, the period between successive positions of the engine crankshaft in which a piston is in position for firing is measured and presented as an 8-bit digital word by the circuitry of block 10. Reference marks spaced 720/N degrees about the circumference of the engine flywheel are detected by magnetic or optical sensing means (not shown) and shaped into ignition reference pulses by an amplifier 51. Timing generator 52 includes a 2 MHz oscillator and various frequency dividers to provide clock signals having periods of 1, 16, 32, 64, and 128 microseconds and other reset and synchronizing signals used in the computational process. Clock signals with 64 microsecond periods are applied to a count rate control circuit 53 thence to a counter 54. Circuit 53, in effect, includes two frequency dividers controlled by the count attained by counter 54. Two milliseconds after appearance of the initial ignition reference pulse from amplifier 51, counter 54 begins count of the 64 microsecond pulse and counts for a period of approximately 8 ms., i.e. until a count of 128 is attained. The first frequency divider of circuit 53 is thereupon enabled, halving the clock frequency and count of 128 microsecond period clock signals continues for the next approximately eight milliseconds until a count of 192 is reached. The second frequency divider of circuit 53 is thereupon enabled quartering the clock frequency and the count of clock signals having periods of 256 microseconds continues approximately 16 milliseconds until counter 54 reaches its full 8-bit capacity or 256.

Actually, count is interrupted and the contents of counter 54 are transferred to a buffer register 55 upon the appearance of the second ignition reference pulse. The duration of count therefore extends between 2 and 34 ms., depending on engine speed. For an eight cylinder engine the time between ignition reference pulses varies from 2 ms. at 7500 RPM to 30 ms. at 500 RPM. The circuitry of block 10 is capable of encoding, with variable resolution, an 8-bit digital word representing the entire useful speed range of an automobile engine.

The second engine parameter of interest, manifold absolute pressure, is encoded as an 8-bit digital word by the circuitry enclosed by block 12. Manifold pressure is communicated to a pressure transducer 57 which provides an analog voltage output proportional to the applied pressure. An amplifier 58 scales the voltage output of the transducer 57 to a suitable level. A ramp generator 59, synchronized by timing generator 52, produces a linearly increasing voltage having a peak value equal to the maximum expected output of amplifier 58. The period of the ramp function is selected to correspond to the time required for a full 8-bit digital word count of clock pulses from timing generator 52. A comparator 61 supplies an enabling signal to an 8-bit counter 62, which receives clock pulses from timing generator 52, so long as the magnitude of the output voltage of ramp generator 59 is less than the magnitude of the output voltage of amplifier 58. Counter 62 will therefore accumulate a count during each ramp function cycle which is linearly related to the magnitude of the output of amplifier 58. This count is transferred to a buffer register 63 during each ignition cycle.

The third engine parameter of interest, coolant temperature, is converted to an 8-bit digital word by the circuitry enclosed by block 14 which functions in the same manner as that of block 12, except that the source of the temperature analog voltage is a voltage divider network which includes a temperature sensitive resistor 65 exposed to the engine coolant. Buffer register 66 contains the 8-bit digital word indicative of engine temperature and this word is up-dated during each ignition cycle.

Circuits corresponding to those of blocks 10, 12 and 14 are described in greater detail in said U.S. Pat. No. 4,142,493 with reference to FIGS. 4 and 6 thereof.

The four most significant bits, $S_i$, of the 8-bit engine speed word contained in buffer 55 and the three most significant bits, $P_j$ or $T_j$, of each of the 8-bit word representing manifold pressure and temperature respectively contained by buffers 63 and 66 are conducted in parallel to memory address control 16. There the four most significant bits of the speed word are combined with the three most significant bits of the manifold pressure word creating a 7-bit word for addressing any one of the 128 locations of memory 18. Likewise, the four most significant bits of the speed word are combined with the three most significant bits of the temperature word creating a 7-bit word for addressing any one of the 128 locations of memory 20.

Spark angle advance information is stored in memory 18 for combinations of sixteen different engine speeds and eight different values of manifold pressure. This information is in the form of an 8-bit digital word representing the value of the quantity $(1-\theta/K)$ where $\theta$ is the desired spark angle advance and K is a constant equal to the number of degrees separating the timing marks on the engine flywheel (90 degrees for an eight cylinder engine). The stored information is entirely independent of time, the only variable therein being the number of degrees of the desired spark angle advance. The decimal value of the quantity $(1-\theta/K)$ is encoded as an 8-bit digital word wherein the most significant digit has a decimal value of $\frac{1}{2}$ and the least significant digit has a decimal value of 1/256. Thus, if the spark angle advance to be stored is 30 degrees, assuming an eight cylinder engine, the value of the quantity $(1-\theta/K)$ is $1-30/90=0.667$, which is encoded as $10101011 = \frac{1}{2} + \frac{1}{8} + 1/32 + 1/128 + 1/256 = 0.668$.

The 8-bit digital word recovered from memory 18 according to the address represented by the four most significant digits of the speed word and the three most siginificant digits of the pressure word is transferred serially through scaling circuitry 22, gating logic 67 and adder 68 to "A" register 24. The four least significant bits, $\Delta S$, or their compliments, $\overline{\Delta S}$, of the speed word contained by buffer 55 and the five least significant bits, $\Delta P$ and $\Delta T$, or their compliments $\overline{\Delta P}$ and $\overline{\Delta T}$, of the pressure and temperature words contained by buffers 63 and 66 control, in sequence determined by timing generator 52, scaling circuitry 22 to shift the data transferred therethrough appropriate numbers of places to the left.

The shifted data is added to the data contained by "A" register 24 by gating logic 67 and adder 68 to perform multiplication of data retrieved by the least significant bits of the speed, pressure and temperature words as required in the interpolation process.

In the interpolation, four data points of memory 18 are addressed by the cooridnates $S_i$, $P_j$; $S_{i+1}$, $P_j$; $S_i$, $P_{j+1}$; and $S_{i+1}$, $P_{j+1}$. These points can be considered the four corners of an area on the stored data surface containing the spark advance angle prescribed for the full 8 digit resolution of the speed and pressure words, which point would be located on the surface at the coordinates $S_{i+\Delta s}$ and $P_{j+\Delta P}$. The interpolation involves the solution of the equation $$32 f(S_{i+s}, P_{j+\Delta P}) = \left(\frac{32 - \Delta P}{16}\right) [(16 - \Delta S) f(S_i, P_j) + \Delta S f(S_{i+1}, P_j)] + \frac{\Delta P}{16} [(16 - \Delta S) f(S_i, P_{j+1}) + \Delta S f(S_{i+1}, P_{j+1})].$$

The interpolation process is accomplished in steps, the first of which involves retrieving the data, $f(S_i, P_j)$ from memory 18 and loading the same into "A" register 24. Then $f(S_i, P_j)$ is multiplied by $\overline{\Delta S}_o$, the complement of the least significant bit of $\Delta S$, and added to the contents of the "A" register. Next $f(S_i, p_j)$ is shifted one place to the left,, multiplied by $\overline{\Delta S}_1$ and added to the contents of "A" register. Then $f(S_i, P_i)$ is shifted two places to the left, multiplied by $\overline{\Delta S}_2$ and added to the contents of "A" register. To conclude the first step $f(S_i, P_j)$ is shifted three places to the left, multiplied by $\Delta S_3$ and added to the contents of "A" register. At the end of the first step "A" register 24 contains the quantity $(16-\Delta S) \cdot f(S_i, P_j)$.

At the beginning of the second step of interpolation the most significant bits of the speed word are incremented one bit and memory 18 is readdressed to obtain the data $f(S_{i+l}, P_j)$ located at the address identified by $S_{i+l}, P_j$. This data is shifted successively to the left and multiplied by bits of the least significant bits of the speed word in ascending order of significance so that at the end of second step "A" register 24 contains the quantity $$(16-\Delta S) \cdot f(S_i, P_j) + \Delta S \cdot f(S_{i+l}, P_j).$$

At the beginning of the third step the "A" register contents are shifted four places to the right, thereby dividing by 16, and the contents are then transferred to the "B" register 26 without clearing the "A" register. In the next operation the contents of the "A" register are added to the contents of the "B" register together with the product of the complement of the least significant bit of the five bit ΔP word and the contents of the "A" register. At the conclusion of this operation the contents of the "A" register are added to themselves thereby shifting the same one place to the left in preparation for the next transfer operation to the "B" register. In the next operation the contents of the "A" register, now double the contents at the beginning of the third step, are added to the contents of the "B" register together with the product of the complement of the next to least significant bit of ΔP and the "A" register contents and the "A" register contents are again added to themselves in preparation for the next transfer operation to the "B" register. The operation of adding the "A" register contents to the "B" register contents, adding the product of the "A" register contents and the complement of the appropriate bit of ΔP and adding the contents of the "A" register to themselves is repeated three more times, at the end of which the "B" register will contain the quantity:

$$\frac{(32-P)}{16}[(16-\Delta S) f(S_i, P_j) + \Delta S f(S_{i+l}, P_j)].$$

At the fourth step of interpolation the "A" register is cleared, the most significant bits of the pressure word as incremented and memory 18 is readdressed to obtain the data stored therein at the coordinates $(S_i, P_{j+l})$ and step one of the interpolation process is carried out. The fifth step is similar to the second step, utilizing data accessed in memory 18 at the coordinates $S_{i+l}, P_j+1$ so that at the end of this step the "A" register contains $$(16-\Delta S) f(S_i, P_{j+l}) + \Delta S f(S_{i+l}, P_{j+l}).$$

At the beginning of the sixth step the "A" register contents are shifted four places to the right, dividing by 16. The "A" register contents are then multiplied by the least significant bit of the pressure word ΔP and added to the contents of the "B" register accumulated during the first three steps of interpolation, following which the "A" register contents are added to themselves, shifting the contents one place to the left in preparation for the next transfer operation to the "B" register. The next four operations each comprise multiplying the "A" register contents by a bit of ascending order of significance of the pressure word, adding the resulting product to the "B" register contents and adding the "A" register contents to themselves in preparation for the succeeding operation. Note that the sixth step differs from the third step in that only the product of the "A" register contents and ΔP are added to the "B" register contents during the sixth step, whereas the third step involves adding to the "B" register the progressively shifted "A" register contents as well as the product of the compliment of ΔP and the initial "A" register contents. At the end of the sixth step, the interpolation process for data from memory 18 is complete and the "B" register contains the quantity $32 f(s_{i+\Delta S}, P_{j+\Delta P})$.

The "B" register contents are retained, the "A" register is cleared, and memory 20 is next addressed to obtain the data stored therein as a function of speed and temperature. Interpolation is performed on the data from memory 20 in the same manner as was performed on the data from memory 18 so that at the conclusion of the second interpolation interval the "B" register contains the sum of the spark advance interpolated from the data of memories 18 and 20. Complete interpolation of the data from one of the memories is performed in an interval of 0.768 milliseconds so that interpolation is complete as to both memories well within the two millisecond period beween ignition reference marks occurring at the top engine speed of 7500 RPM. The interpolation process and circuits for accomplishing it are described in greater detail in said application Ser. No. 837,657 with particular reference to FIGS. 10, 11 and 17 thereof.

"C" register 28 contains the spark advance angle function $(1-\theta/K)$ used for the most recent engine firing. When the interpolation process is completed as to both memories 18 and 20, the contents of the "C" register are subtracted from the contents of the "B" register and a programmable fraction of the difference, as determined by rate control 30, is added to the "C" register contents to up-date the latter for the next engine firing. The "C" register contents can therefore change only at a rate depending on the value of the fraction and the up-date period, i.e. the engine firing interval. Such a filtering action smoothes the engine operation which would tend to roughness if abrupt changes in spark timing were permitted. The value of the fraction used in this operation may be present or may be controlled by an engine parameter such as speed, pressure or temperature. The sign of the difference between the "C" register contents and the "B" register contents may be used to select different values for the fraction by which the difference is multipled to provide different rates for spark angle advance and for spark angle retard. A corresponding filtering action and circuits for accomplishing it are described in detail in said U.S. Pat. No. 4,142,493 with particular reference to FIG. 11 thereof.

Upon the appearance of an ignition reference pulse the seven most significant bits of the contents of "C" register 28 are transferred serially to "D" register 32. The "D" register contents are applied in parallel to an eight bit binary rate multiplier 34. Rate multiplier 34, which can comprise two cascaded four bit rate multipliers RCA type CD 4089, or equivalent, outputs a fractional part of the clock pulses applied thereto, according to the value of the output word from "D" register 32. Clock pulses of 32 microseconds period are supplied to rate multiplier 34 by timing generator 52, and the output pulses are counted by a twelve bit up counter 36 during the interval between ignition reference pulses.

Upon the occurrence of each ignition reference pulse, the count accumulated by up counter 36 during the preceding firing interval is loaded in parallel into a twelve bit presettable down counter 38; "D" register 32 is cleared and the up-dated spark angle data from "C" register 28 is loaded therein for control of rate multiplier 34 during the current firing interval and down count of the newly received output of counter 36 is begun by counter 38. The contents of counter 38 are decremented by 32 microseconds spaced clock pulses until depleted to zero whereupon ignition coil current control flip-flop 40 is reset causing the Q output thereof to go low. The Q output of flip-flop 40 is applied to a switching transistor in a conventional transistor ignition system so that a low Q output interrupts current in the ignition coil primary while a high Q output enables current flow therein.

Flip-flop 40 is set, causing Q to go high and establishing ignition coil primary current, by "E" register 42. The contents of "E" register 42 vary cyclically between zero and some positive value during each firing cycle. Clock signals of frequency $F_1$ or $F_2$ from timing generator 52 are selected by gating logic 44 to increment "E" register 42 at the rate $F_1$ or to decrement the register at the rate $F_2$. At the time down counter 38 is counted down to zero and spark is triggered, logic 44 selects $F_2$ to decrement the "E" register from its most recently accumulated count. The "E" register then counts down for a period depending upon the value of the most recently accumulated count and the frequency $F_2$ until the register contents are zero. During this period flip-flop 40 remains reset and no current flows in the ignition coil primary. When the "E" register contents are depleted to zero, a set signal is applied to flip-flop 40 and gating logic 44 selects clock signals of frequency $F_1$ to increment the "E" register and rebuild a count therein. Accumulation of count at the frequency $F_1$ continues until the next spark trigger appears from down counter 38.

Conversion of the spark advance angle data contained by "D" register 32 to a timing signal and the operation of "E" register 42 to establish coil current dwell will be better understood with the aid of FIG. 2, to which reference is now made.

Line A of FIG. 2 indicates the time at which the engine pistons reach top dead center of the crankshaft. As shown in line B ignition reference marks ae positioned on the engine flywheel to generate ignition reference signals at a time in advance of piston top center. This provides an initial spark advance for engine starting. The reference marks are spaced 90° apart on the flywheel for an eight cylinder engine.

When an ignition reference signal appears, the "C" register 28 contents are loaded into the "D" register 32 for control of the rate multiplier 34 and count begins in up counter 36 at a fraction of the clock rate and continues during the interval between ignition reference signals until reset by the next ignition reference signal. This action is shown as the solid line 36 on line C of FIG. 2. Also seen on line C is the dashed line 38 representing the action of down counter 38. At each ignition reference signal down counter 38 begins at the count reached by up counter 36 during the previous interval between ignition reference signals and counts towards zero at the full clock rate. Upon reaching zero, down counter 38, through flip-flop 40, interrupts the ignition coil primary current, shown in line D of FIG. 2, generating the spark.

As a specific example of the actions of counters 36 and 38, suppose that 30° advance in addition to the initial advance is required. This advance will be contained by "C" register 28 as the quantity $1-30/90=.667$ encoded as 10101011. The seven most significant bits of the "C" register contents control the rate multiplier 34 as follows:

$$f_o = [D/128]f_l$$

where
 $f_o$ is the output rate
 D is the decimal equivalent of the "D" register contents; and
 $f_l$ is the clock frequency.

Applying the above to the example, "D" register contents are 1010101 and D=85.
Then $$f_o = [85/128]f_l = 0.664 f_l.$$

If T is the time between ignition reference signals, which is likewise the time for 90° crankshaft rotation (8 cylinders), the count accumulated by up counter 36 will be $0.664 f_l T$. The time t at which spark occurs following an ignition reference signal will be $0.664 f_l T/f_l$ and that same time occurs in advance of the next ignition reference signal at a time $T-t=(1-.664)T$. Since T, whatever the engine speed may be, always is equivalent to 90° crank rotation, in terms of degrees, the spark advance will be $(1-.664) 90° = 30.24°$.

Line E of FIG. 2 illustrates the operation of "E" register 42 in controlling the dwell or duty cycle of the ignition coil primary current. Neglecting the transient condition at engine start-up, and considering only the steady state condition, at some time during the interval between ignition reference signals the "E" register contents are zero and it commences to accumulate count at a rate $F_1$. Ignition coil current flows during the time the "E" register is accumulating count and until spark is triggered. At that time the count accumulated by the "E" register will be count=(time on).$F_1$. When spark occurs the "E" register commences decrementing the just accumulated count at the rate $F_2$ and continues until the "E" register contents are zero. During the time the "E" register is being decremented the ignition coil primary current is off, or (time off)=count/$F_2$. Substituting the relationship between count and (time on) in the latter equation and rearranging the dwell is shown to be $$\text{dwell} = (\text{time on})/(\text{time off}) = F_2/F_1.$$

If, for example, 50% dwell is desired the frequency $F_1$ is selected to be twice as large as the frequency $F_2$. Obviously, the dwell is entirely independent of engine speed so long as the capacity of "E" register 42 and the frequency $F_1$ are selected so as not to overflow the "E" register at the lower engine speeds. Another matter of choice appears in the selection of the clock frequency for rate multiplier 34 and down counter 38 and in the capacity of counters 36 and 38. The clock frequency must be high enough to provide adequate resolution of spark timing at the higher engine speeds and the counters must have sufficient capacity to count the clock signals without overflow at the lower engine speeds. A clock period of 32 microseconds (31.25 KHz), as specified, provides better than 1° resolution to about 5000 RPM and better than 1.5° up to 7500 RPM while with such a clock frequency twelve bit counters will not overflow at engine speeds above 115 RPM, which is lower than the lowest idle speed for engines in common use.

Obviously many variations are possible in the light of the above teachings. It is therefore to be understood that the invention may be practiced otherwise than as specifically disclosed without departing from the spirit and scope of the appended claims.

The invention claimed is:

1. A digital electronic spark timing control for an internal combustion engine having a spark ignition system with energy storing means and means for discharging stored energy to generate ignition spark, comprising means for measuring and encoding in digital form parameters descriptive of the conditions of operation of said engine;

means for storing digitally a multi-valued function of two independent ones of said engine parameters, said function defining the angle relative to the crankshaft angle of said engine at which ignition is to occur;

means for retrieving from said digital storing means the value of said function stored therein for said measured values of said two independent engine parameters;

means providing reference signals indicative of reference positions of the crankshaft of said engine;

a source of constant frequency clock signals;

rate multiplier means receiving said clock signals and providing at the output thereof a fractional part of said clock signals applied thereto;

means receiving said retrieved value of said function for controlling said rate multiplier means so that said fraction relating the output to input thereof is proportional to said retrieved value of said function;

first counter means synchronized with said reference signals for accumulating a count of the output of said rate multiplier means during the interval between two successive ones of said reference signals;

second counter means synchronized with said reference signals and receiving the count accumulated by said first counter means, said second counter means also receiving said clock signals and decrementing at said clock signal rate the count received from said first signal means; and means for initiating an ignition spark for said engine whenever the count contained by said second counter means is decremented to a predetermined number.

2. A timing control as claimed in claim 1 wherein said means receiving said retrieved value of said function for controlling said rate multiplier means includes means for limiting the rate of change of said function for controlling said rate multiplier means.

3. A timing control as claimed in claim 2 wherein said means for limiting the rate of change of said function comprises first temporary storage means containing said retrieved value of said function;

second temporary storage means the output of which controls said rate multiplier means;

means for determining the difference between the contents of said first temporary storage means and the contents of said second temporary storage means during each engine ignition cycle; and means for adding a fractional part of said difference to the contents of said second temporary storage means during each engine ignition cycle.

4. A timing control as claimed in claim 1 wherein said means for measuring and encoding include means for measuring and encoding as multibit digital words at least two independent engine parameters;

said means for storing digitally includes a digital memory having stored therein values of said function for the most significant bits of said digital words representing said two independent engine variables; and said means for retrieving includes means for interpolating between said values of said function for the most significant bits of said digital words according to the least significant bits of said digital words.

5. A digital electronic spark timing control for an internal combustion engine having a spark ignition system with energy storing means and means for discharging stored energy to generate ignition spark, comprising means for measuring and encoding in digital form parameters descriptive of the conditions of operation of said engine;

means for storing digitally a multi-valued function of two independent ones of said engine parameters, said function defining the angle relative to the crankshaft angle of said engine at which ignition is to occur;

means for retrieving from said digital storing means the value of said function stored therein for said measured values of said two independent engine parameters;

means providing reference signals indicative of reference positions of the crankshaft of said engine;

a source of constant frequency clock signals;

rate multiplier means receiving said clock signals and providing at the output thereof a fractional part of said clock signals applied thereto;

means receiving said retrieved value of said function for controlling said rate multiplier means so that said fraction relating the output to input thereof is proportional to said retrieved value of said function;

first counter means synchronized with said reference signals for accumulating a count of the output of said rate multiplier means during the interval between two successive ones of said reference signals;

second counter means synchronized with said reference signals and receiving the count accumulated by said first counter means, said second counter means also receiving said clock signals and decrementing at said clock signal rate the count received from said first signal means;

means for initiating an ignition spark for said engine whenever the count contained by said second counter means is decremented to a predetermined number;

dwell control means for controlling the duty cycle of said energy storing means, said dwell control means including;

a digital register;

a source of signals having a first frequency for incrementing said register;

a source of signals having a second frequency for decrementing said register;

means applying said first frequency signals to said register during each engine ignition cycle from a time prior to initiation of an ignition spark until initiation of an ignition spark to accumulate a count of said first frequency signals;

means applying said second frequency signals to said register during each ignition cycle from the time of initiation of an ignition spark until the count of said first frequency signals contained in said register is decremented to a predetermined number; and means applying energy to said energy storing means during the time said register is accumulating count of said first frequency signals.

6. A digital electronic spark timing control for an internal combustion engine having a spark ignition system and producing a rotary output motion, comprising means providing timing reference signals indicative of reference angular positions of the output member of said engine;

means for measuring and encoding as multibit digital words at least two independent engine operating variables;

digital memory means having stored therein, at locations each of which is addressable by a composite of said operating variable words, spark timing values, said spark timing values being functions of an angle relative to said reference signals at which ignition spark is to occur;

first temporary storage means;

means operable upon the appearance of a first said reference signal for addressing said memory with a composite of said operating variable words and for transferring to said first temporary storage means the spark timing value located at the address of said composite word;

second temporary storage means;

means operable upon the appearance of a second said reference signal for transferring at a limited rate the contents of said first temporary storage means to said second temporary storage means;

a source of constant frequency clock signals;

rate multiplier means receiving said clock signals and providing at the output thereof a fractional part of said clock signals applied thereto;

means receiving the contents of said second temporary storage means for controlling said rate multiplier means so that said fraction relating the output to input thereof is proportional to the contents of said second temporary storage means;

first counter means synchronized with said reference signals for accumulating a count of the output of rate multiplier means during the interval between two successive ones of said reference signals;

second counter means synchronized with said reference signals and receiving the count accumulated by said first counter means, said second counter means also receiving said clock signals and decrementing at said clock signal rate the count received from said first signal means; and means for initiating an ignition spark for said engine whenever the count contained by said second counter means is decremented to a predetermined number.

7. A timing control as claimed in claim 6 wherein said stored spark timing values are functions of the relationship $(1 - \theta/K)$ in which $\theta$ is the angle relative to a reference angular position of the output member of said engine at which ignition spark is to occur and K is the angular separation of successive reference positions of the output member of said engine.

8. A timing control as claimed in claim 6 wherein said means for transferring the contents of said first temporary storage means to said second temporary storage means comprises means for determining the difference between the contents of said second temporary storage means and the contents of said first temporary storage means; and means for adding a fraction of said difference to the contents of said second temporary storage means.

9. A digital electronic spark timing control for an internal combustion engine having a spark ignition system and producing a rotary output motion, comprising means providing timing reference signals indicative of reference angular positions of the output member of said engine;

means for measuring and encoding as multibit digital words at least two independent engine operating variables;

digital memory means having stored therein, at locations each of which is addressable by a composite of said operating variable words, spark timing values, said spark timing values being functions of an angle relative to said reference signals at which ignition spark is to occur;

first temporary storage means;

means operable upon the appearance of a first said reference signal for addressing said memory with a composite of said operating variable words and for transferring to said first temporary storage means the spark timing value located at the address of said composite word;

second temporary storage means;

means operable upon the appearance of a second said reference signal for transferring at a limited rate the contents of said first temporary storage means to said second temporary storage means;

a source of constant frequency clock signals;

rate multiplier means receiving said clock signals and providing at the output thereof a fractional part of said clock signals applied thereto;

means receiving the contents of said second temporary storage means for controlling said rate multiplier means so the said fraction relating the output to input thereof is proportional to the contents of said second temporary storage means;

first counter means synchronized with said reference signals for accumulating a count of the output of rate multiplier means during the interval between two successive ones of said reference signals;

second counter means synchronized with said reference signals and receiving the count accumulated by said first counter means, said second counter means also receiving said clock signals and decrementing at said clock signal rate the count received from said first signal means;

means for initiating an ignition spark for said engine whenever the count contained by said second counter means is decremented to a predetermined number;

energy storage means for generating an ignition spark by discharge of energy stored therein means for controlling the duty cycle of said energy storage means, comprising:

a digital register;

a source of signals having a first frequency for incrementing said register;

a source of signals having a second frequency for decrementing said register;

means applying said first frequency signals to said register during each engine ignition cycle from a time prior to initiation of an ignition spark until initiation of an ignition spark to accumulate a count of said first frequency signals;

means applying said second frequency signals to said register during each ignition cycle from the time of initiation of an ignition spark until the count of said first frequency signals contained in said register is decremented to a predetermined number and for activating said means applying said first frequency signals to said register upon the contents thereof being decremented to said predetermined number; and means applying energy to said energy storing means during the time said register is accumulating count of said first frequency signals.

10. A digital electronic spark timing control as claimed in claim 9 wherein said first frequency is higher than said second frequency.

11. The method of controlling spark timing for an internal combustion engine having a spark ignition system, comprising, measuring at least two independent engine operating parameters encoding as separate multibit digital words said measured parameters storing in digital storage means values of spark timing expressed as a function of degrees in advance of the full engine compression at which spark is to occur, said values of spark timing being these prescribed for combinations of the most significant bits of a range of values of said encoded parameters and stored at locations in storage means corresponding to the values of said parameters to which said values of spark timing relate;

addressing said storage means at a location defined by the combination of the most significant bits of two said multibit digital words representing said measured operating parameters to obtain a first value of spark timing;

incrementing the most significant bits of one of said measured parameter digital words and addressing said storage means at a location defined by a combination of said incremented most significant bits and the most significant bits of the other of said measured parameter digital words to obtain a second value of spark timing;

incrementing the most significant bits of the other of said measured parameter digital words and addressing said storage means at a location defined by a combination of the most significant bits of said one measured parameter digital word and said incremented most significant bits of the other of said measured parameter digital words to obtain a third value of spark timing;

incrementing the most significant bits of both said measured parameter digital words and addressing said storage means at a location defined by a combination of said incremented most significant bits of both said measured parameter digital words to obtain a fourth value of spark timing;

interpolating between said first, second, third and fourth values of spark timing in accordance with the least significant bits of both said measured parameter digital words to obtain a single value of spark timing prescribed for said measured parameters when each are resolved as to all the bits of both said multibit words; and applying with reference to the full compression point of said engine said single value of spark timing to means for initiating an engine ignition spark.

12. A digital electronic spark timing control for an internal combustion engine having a spark ignition system, comprising, means for measuring at least two independent engine operating parameters;

means for encoding as multibit digital words each having most significant bits and least significant bits said measured engine parameters;

digital memory means having stored therein digital numbers related to the angle in advance of the full compression angle of the engine at which spark is to occur, said digital numbers being stored at a plurality of locations in said memory each of which is defined by a combination of the most significant bits of said digital words for a range of values of said two operating parameters;

means for retrieving from said memory a first digital number stored therein at the location identified by the combination of the most significant bits of said two digital words encoding said measured engine parameters and for retrieving from said memory three additional digital numbers at locations adjacent the location of said first digital number;

means for interpolating between said retrieved first digital number and said three additional retrieved digital numbers in accordance with the least significant bits of both said digital words encoding said measured engine parameters to obtain a fifth digital number related to the advance angle in the engine combustion cycle at which spark is to occur;

temporary storage means;

means for transferring at a limited rate said fifth digital number to said temporary storage means;

means providing reference signals related to the full compression angle of the engine;

means controlled by the contents of said temporary storage means and synchronized with said reference signals for initiating an engine ignition spark.

13. A spark timing control as claimed in claim 12 wherein said digital numbers stored in said memory means are functions of the relationship $(1-\theta/K)$ wherein $\theta$ is the angle in advance of full engine compression at which spark is to occur and K is related to the full compression angle of the engine.

14. A spark timing control as claimed in claim 13 wherein said means for transferring at a limited rate said fifth digital number to said temporary storage means includes means for determining the difference between the contents of said temporary storage means and said fifth digital number; and means for adding a fraction of said difference to the contents of said temporary storage means.

15. A spark timing control as claimed in claim 13 wherein said means controlled by the contents of said temporary storage means comprises a source of clock signals of constant frequency;

rate multiplier means receiving said clock signals and the contents of said temporary storage means and providing output signals having a frequency which is a fractional part of the frequency of said clock signals, said fractional part being proportional to the contents of said temporary storage means;

first counter means synchronized with said reference signals for counting the output of said rate multiplier means;

second counter means synchronized with said reference signals;

means synchronized with said reference signals for tranferring the count accumulated by said first counter means to said second counter means, said second counter means decrementing said count transferred thereto at said clock frequency until said transferred count reaches a predetermined number; and means for initiating an engine ignition spark when said transferred count reaches said predetermined number.

16. A digital electronic spark timing control for an internal combustion engine having a spark ignition system, comprising means for measuring at least two independent engine operating parameters;

means for encoding as multibit digital words each having most significant bits and least significant bits said measured engine parameters;

digital memory means having stored therein digital numbers related to the angle in advance of the full compression angle of the engine at which spark is to occur, said digital numbers being stored at a plurality of locations in said memory each of which is defined by a combination of the most significant bits of said digital words for a range of values of said two operating parameters;

means for retrieving from said memory a first digital number stored therein at the location identified by the combination of the most significant bits of said two digital words encoding said measured engine parameters and for retrieving from said memory three additional digital numbers at locations adjacent the location of said first digital number;

means for interpolating between said retrieved first digital number and said three additional retrieved digital numbers in accordance with the least significant bits of both said digital words encoding said measured engine parameters to obtain a fifth digital number related to the advance angle in the engine combustion cycle at which spark is to occur;

temporary storage means;

means for transferring at a limited rate said fifth digital number to said temporary storage means;

means for transferring at a limited rate said fifth digital number to said temporary storage means;

means providing reference signals related to the full compression angle of the engine;

means controlled by the contents of said temporary storage means and synchronized with said reference signals for initiating an engine ignition spark;

energy storage means for generating an ignition spark by discharge of energy stored therein;

means controlling the proportion of time during each ignition cycle during which energy is supplied to said storage means, comprising a digital register;

a source of signals having a first frequency;

a source of signals having a second frequency;

means for applying signals of said first frequency to said register from a time prior to initiation of an ignition spark until initiation of an ignition spark to accumulate a count therein of said first frequency signals;

means operative upon initiation of an ignition spark to apply said second frequency signals to said register to decrement the count therein until a predetermined number is reached and thereupon to actuate said means applying said first frequency signals; and means for supplying energy to said energy storage means during the time said first frequency signals are being applied to said register.

* * * * *